United States Patent
Chiou et al.

(10) Patent No.: US 7,733,959 B2
(45) Date of Patent: Jun. 8, 2010

(54) VIDEO CONVERSION METHODS FOR FRAME RATE REDUCTION

(75) Inventors: Hung-Jr Chiou, Taichung (TW); Wei-Jen Lee, Taipei (TW); Wen-Jen Ho, Hualien (TW)

(73) Assignee: Institute for Information Industry, Tapei (TW)

( * ) Notice: Subject to any disclaimer, the term of this patent is extended or adjusted under 35 U.S.C. 154(b) by 1400 days.

(21) Appl. No.: 11/147,425

(22) Filed: Jun. 8, 2005

(65) Prior Publication Data

US 2006/0280247 A1  Dec. 14, 2006

(51) Int. Cl.
*H04N 7/12* (2006.01)
*G06K 9/36* (2006.01)

(52) U.S. Cl. .................. 375/240.16; 382/236

(58) Field of Classification Search ............... 382/236, 382/238, 239; 348/416.1, 413.1; 375/240.1, 375/240.04, 240.05, 240.06, 240.07, 240.13, 375/240.24, 240.16, 240.12
See application file for complete search history.

(56) References Cited

U.S. PATENT DOCUMENTS

| 6,400,763 | B1 * | 6/2002 | Wee ...................... 375/240.16 |
| 2003/0202605 | A1 * | 10/2003 | Hazra et al. ............ 375/240.26 |
| 2004/0156436 | A1 * | 8/2004 | Seo ....................... 375/240.16 |
| 2005/0089092 | A1 * | 4/2005 | Hashimoto et al. ..... 375/240.03 |
| 2005/0089232 | A1 * | 4/2005 | Hsu et al. .................. 382/236 |

* cited by examiner

*Primary Examiner*—Behrooz Senfi
(74) *Attorney, Agent, or Firm*—Birch, Stewart, Kolasch & Birch, LLP (57) ABSTRACT

A video conversion method for frame rate reduction. Video data comprising at least one I-frame and a plurality of B- and P-frames is provided. The B- and P-frames are converted to P-frames using a first image processing method, thereby leaving the I-frame and a plurality of P-frames. A frame rate reduction operation is implemented based on the converted frames using a second image processing method.

9 Claims, 7 Drawing Sheets

VIDEO CONVERSION METHODS FOR FRAME RATE REDUCTION

BACKGROUND

The invention relates to video processing methods, and more particularly, to video conversion methods for frame rate reduction.

MPEG-4 is an ISO/IEC standard developed by Moving Picture Experts Group (MPEG), the committee that also developed the Emmy Award winning standards known as MPEG-1 and MPEG-2. MPEG-4 is the successor to MPEG-1 and MPEG-2 video standards. ISO standard committee implemented this standard in 1998. Instead of using current frame-based video technology, it adopts the object-oriented concept, which integrates existing multimedia technologies, such as 2D/3D graphics, animation, video codec, multimedia streaming, interactive, and programmatic environments into a single architecture.

The following describes video processing based on MPEG-4 format images.

A video stream is a sequence of video frames. Each frame is a still image. A video player displays one frame after another, usually at a rate close to 30 frames per second. Frames are divided into 16×16 pixel macroblocks (not shown). Each macroblock consists of four 8×8 luminance blocks and two 8×8 chrominance blocks (1 U and 1 V) (not shown). Macroblocks are the units for motion-compensated compression. Blocks are used for DCT compression.

Video data complying with the MPEG-4 format files is composed of three different types of frames, comprising intra-frames (I-frames), forward predicted frames (P-frames), and bidirectional predicted frames (B-frames). An I-frame is encoded as a single image, with no reference to any past or future frames, referring to the fact that the various lossless and lossy compression techniques are performed relative to information that is contained only within the current frame, and not relative to any other frame in the video sequence. In other words, no temporal processing is performed outside of the current picture or frame. A P-frame is encoded relative to the past reference frame. A reference frame is a P- or I-frame. The past reference frame is the closest preceding reference frame. Each macroblock in a P-frame can be encoded either as an Intra-macroblock or as a Inter-macroblock. An Intra-macroblock is encoded just like a macroblock in an I-frame encoded with no reference. A B-frame is encoded relative to the past reference frame, the future reference frame, or both frames. The future reference frame is the closest following reference frame (I or P). The encoding for B-frames is similar to P-frames, except that motion vectors may refer to areas in the future reference frames. For macroblocks that use both past and future reference frames, the two 16×16 areas are averaged.

As described above, a video stream is a sequence of video frames. An input encoded sequence of video frames, for example, is represented as "I(0) P(3) B(1) B(2) P(6) B(4) B(5) I(9) B(7) B(8) P(12) B(11) P(12)" (the bracketed number is the display order of each frame). The output decoded sequence of the video frames is then represented as "I(0) B(1) B(2) P(3) B(4) B(5) P(6) B(7) B(8) I(9) B(10) B(11) P(12)".

Conventional video conversion methods reduce frame rates of dynamic compression images for the following purposes. Reducing frame rate to reduce bit-rates of image data satisfies insufficient bandwidth of video transmission, lower efficiency of play devices, and rapidly browsing with limited time.

Generally, implementations of frame rate reduction can only process fixed and predetermined multiple ratios. Selections and calculations for motion vectors corresponding to each frame rate reduction method are complicated and different for each, such that each reduction program must be designed for each desired frame rate, increasing difficulties in program design and renders it incapable of involving all multiple ratios of frame rates. Consequently, play devices can only select and play applicable frame rates of image data, a fixed number of program segments are required based on the fixed number of frame rates, and complete viewing is impossible due to the limited time.

Thus, an improved method for video frame rate reduction is desirable.

SUMMARY

Video conversion methods for frame rate reduction are provided. In an embodiment of such a method, video data comprising at least one I-frame and a plurality of B- and P-frames is provided. The B- and P-frames are converted to P-frames using a first image processing method, thereby remaining the I-frame and a plurality of P-frames. A frame rate reduction operation is implemented based on the converted frames using a second image processing method.

Also disclosed is another video conversion method for frame rate reduction. In an embodiment of such a method, video data comprising at least one I-frame, a first frame, and a second frame is provided. The I-frame is the first placed frame and the first frame is between the I-frame and second frame. A first MOR and a second MOR of the B-frame are calculated. The first MOR relates to a first motion vector directed to the I-frame and the second MOR relating to a second motion vector directed to the second frame. The first and second MORs compared and a desired motion vector of the first frame is determined accordingly. The first frame is converted to a P-frame using a first image processing method according to the desired motion vector. A frame rate reduction operation is implemented based on the converted frames using a second image processing method.

BRIEF DESCRIPTION OF THE DRAWINGS

The invention can be more fully understood by reading the subsequent detailed description and examples of embodiments thereof with reference made to the accompanying drawings, wherein.

DETAILED DESCRIPTION

The invention discloses a video conversion method and system for frame rate reduction.

The invention provides a two-step motion vector processing method, first converting P- or B-frames to P-frames using motion vectors of macroblocks of input images and calculating required motion vectors of converted P-frames corresponding to a desired frame rate. Additionally, the invention utilizes, but is not limited to, an improved Bi-directional Dominant Vector Selection (BDVS) method disclosed in "ADAPTIVE FRAME-SKIPPING FOR VIDEO TRANSCODING" by 2003 International Conference on Image Processing (ICIP) for video conversion.

Figure 1:
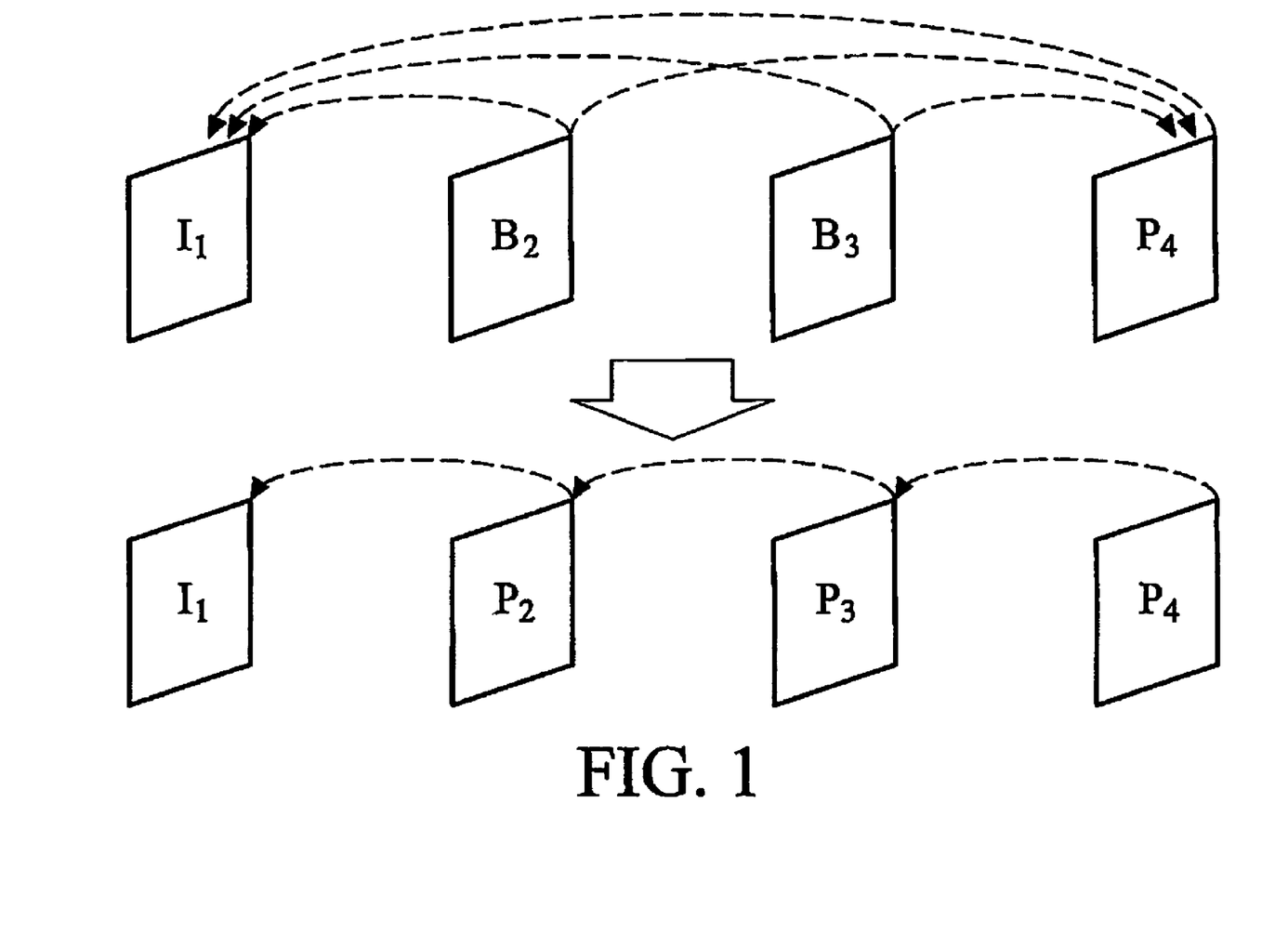
FIG. 1 is a schematic view of an embodiment of video frame conversion for a sequence of video data.

FIG. 1 is a schematic view of an embodiment of video frame conversion from a B or P type frame to a P type frame. An input encoded sequence of video frames, for example, represented as "$I_1 B_2 B_3 P_4$" is converted to an output decoded sequence of the video frames represented as "$I_1 P2 P_3 P_4$". In such a video sequence, three types of conversion operations are provided, as shown in Table 1.

TABLE 1

|  | Input Frame Type | Previous Input Frame Type |
|---|---|---|
| Type 1 | $B_2$ | I or P |
| Type 2 | $B_3$ | B |
| Type 3 | $P_4$ | B |

In this embodiment, frame conversion comprises, but is not limited to, three types, in which $B_2$ frame is converted to $P_2$ frame and comprises a past reference frame ($I_1$ frame) and a further reference frame ($P_4$ frame), $B_3$ frame is converted to $P_3$ frame and comprises a past reference frame ($I_1$ frame) and a further reference frame ($P_4$ frame), and $P_4$ frame is converted to $P_4$ frame and comprises a past reference frame ($I_1$ frame)

Figure 2A:
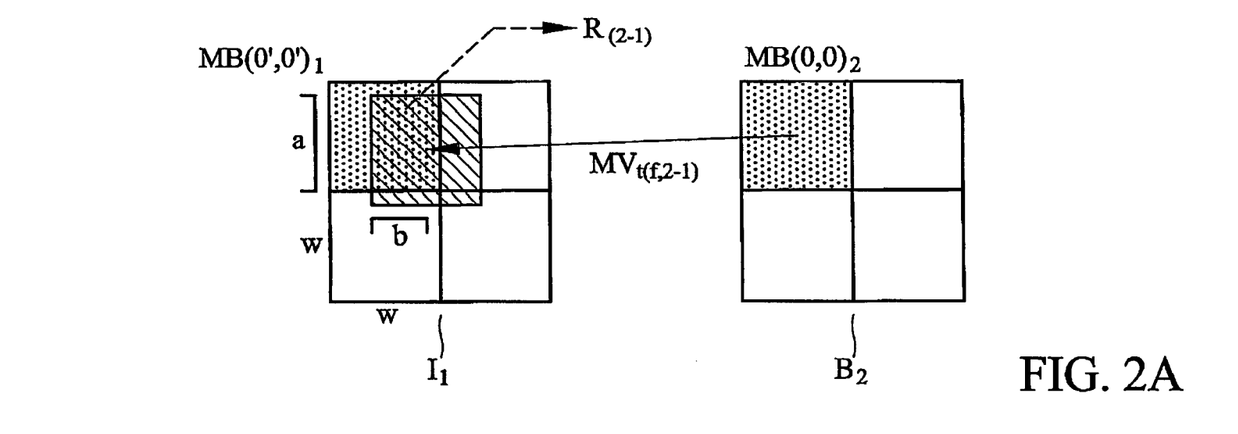
FIGS. 2A and 2B are schematic views of an embodiment of video frame conversion from a B-frame to a P-frame, in which the B-frame is placed between an I-frame and a B-frame.
Figure 2B:
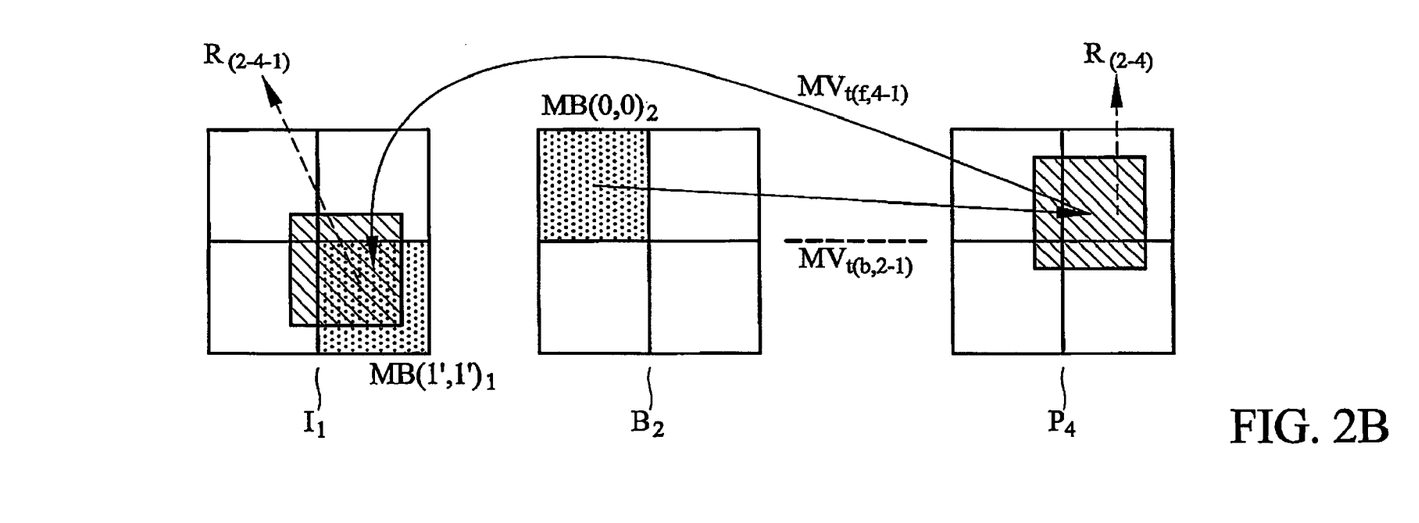

Referring to FIGS. 2A and 2B, considering type 1, $B_2$ frame comprises two different directional motion vectors, one is from $B_2$ frame to $I_1$ frame and the other is from $B_2$ frame to $P_4$ frame. A macroblock $MB(0,0)_2$ of $B_2$ frame comprises two different motion vectors, $MV_{t(f,2-1)}$ and $MV_{t(b,2-4)}$. To determine $MB(0',0')_1$ or $MB(1',1')_1$ as a target macroblock, a Maximum Overlapping Ration (MOR) is calculated using the following equation, represented as:

$$R = \frac{a \times b}{w \times w}, \quad (1)$$

where R is a maximum overlapping ratio and w is a length of one side of the square macroblock $MB(0',0')_1$, and a and b are lengths of a, b are lengths of both sides of a virtual macroblock overlapping the macroblock $MB(0',0')$, as shown in FIG. 2A.

A desired motion vector from the converted $B_2$ frame (i.e. $P_2$ frame) is determined by the motion vector from $B_2$ frame to $I_1$ frame or subtracting the motion vector from $B_2$ frame to $P_4$ frame from the motion vector from $P_4$ frame to $I_1$ frame using the equation (1), thereby calculating MORs $R_{(2-1)}$ and $R_{(2-4-1)}$ respectively for comparison. Next, MORs $R_{(2-1)}$ and $R_{(2-4-1)}$ of dominant macroblocks are compared using the following equation, represented as:

$$\max(R_{(2-1)}, R_{(2-4-1)}) \quad (2).$$

If $R_{(2-1)} > R_{(2-4-1)}$, the macroblock $MB(0',0')_1$ is determined as a dominant macroblock using the BDVS method. Thus, the motion vector of the macroblock $MB(0,0)_2$ is re-calculated and obtained as $MV_{t(f,2-1)}$. As a result, a desired motion vector $MV_{T(f,2-1)}$ is calculated and represented as:

$$MV_{T(f,2-1)} = MV_{t(f,2-1)} \quad (3).$$

Conversely, if $R_{(2-1)} < R_{(2-4-1)}$, the macroblock $MB(1',1')_1$ is determined as a dominant macroblock using the BDVS method. Thus, the motion vector of the macroblock $MB(0,0)_2$ is re-calculated and obtained as $MV_{t(b,2-4)}$ and $MV_{t(f,4-1)}$. The motion vector $MV_{t(f,4-1)}$ is calculated using interpolation, multiplying MORs by motion vectors of each overlapped macroblock, represented as:

$$\sum_{n=1}^{4} \left( MV_{(4-1)_n^1} \times R_{(2-4)_n^1} \right), \quad (4)$$

where n represents the four macroblocks overlapped by a virtual macroblock whose MOR is $R_{(2-4)}$. As a result, the desired motion vector $MV_{T(f,2-1)}$ is calculated and represented as:

$$MV_{T(f,2-1)} = MV_{t(b,2-4)} + \sum_{n=1}^{4} \left( MV_{(4-1)_n^1} \times R_{(2-4)_n^1} \right). \quad (5)$$

Figure 3A:
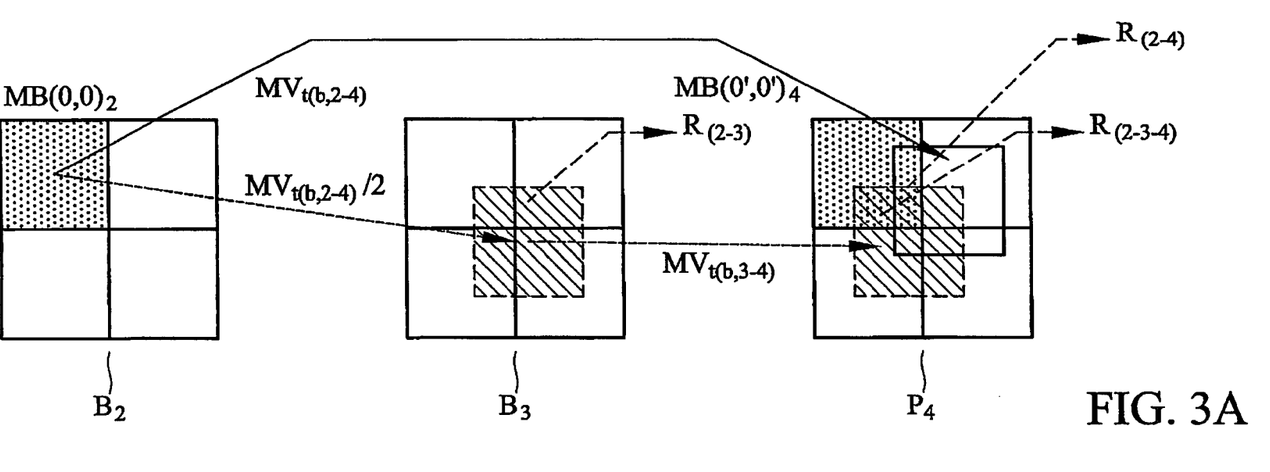
FIGS. 3A and 3B are schematic views of an embodiment of video frame conversion from a B-frame to a P-frame, in which the B-frame is placed between a B-frame and a P-frame.
Figure 3B:
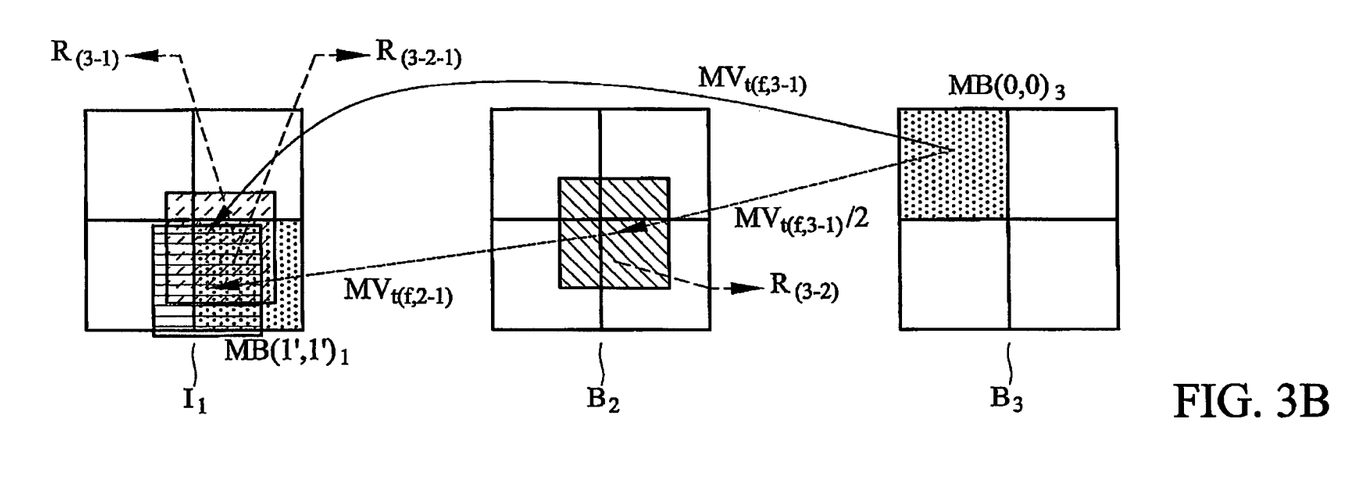

Referring to FIGS. 3A and 3B, considering the type 2, $B_3$ frame comprises two different directional motion vectors, one is from $B_3$ frame to $I_1$ frame and the other is from $B_3$ frame to $P_4$ frame. A macroblock $MB(0,0)_3$ of $B_3$ frame comprises two different motion vectors. Similarly, as shown in FIGS. 2A and 2B, a desired motion vector from the converted $B_3$ frame (i.e. $P_3$ frame) is determined by subtracting a halved motion vector from $B_2$ frame to $P_4$ frame from the motion vector from $B_2$ frame to $P_4$ frame or subtracting a halved motion vector from $B_3$ frame to $I_1$ frame from the motion vector from $B_3$ frame to $I_1$ frame using the equation (1), thereby calculating MORs $R_{(2-4)}$, $R_{(2-3-4)}$, $R_{(3-1)}$, and $R_{(3-2-1)}$ respectively for comparison. Next, MOR $R_{(2-4)}$ relative to MOR $R_{(2-3-4)}$ and MOR $R_{(3-1)}$ relative to MOR $R_{(3-2-1)}$ of dominant macroblocks are compared using the following equation, represented as:

$$\max(R_{(2-4)} \times R_{(2-3-4)}, R_{(3-1)} \times R_{(3-2-1)}) \quad (6).$$

MOR $R_{(2-3-4)}$ is calculated according to a macroblock overlapping $B_3$ frame with the directed motion vector $MV_{t(b,2-4)}/2$. Thus, a motion vector of a macroblock overlapping $P_4$ frame based on the macroblock overlapping $B_3$ frame is calculated using the following equation, represented as:

$$\sum_{n=1}^{4} \left( MV_{(3-4)_n^1} \times R_{(2-3)_n^1} \right). \quad (7)$$

Additionally, MOR $R_{(3-2-1)}$ is calculated according to a macroblock overlapping $B_2$ frame with the directed motion vector $MV_{t(f,3-1)}/3$. Thus, a motion vector of a macroblock overlapping $I_1$ frame based on the macroblock overlapping $B_2$ frame is calculated using the following equation, represented as:

$$\sum_{n=1}^{4}\left(MV_{(2-1)_n^1}\times R_{(3-2)_n^1}\right). \quad (8)$$

If $R_{(2-4)}\times R_{(2-3-1)}>R_{(3-1)}\times R_{(3-2-1)}$, the macroblock MB(0', 0')$_4$ is determined as a dominant macroblock using the BDVS method. Thus, the motion vector of the motion vector of the macroblock MB(0,0)$_2$ is re-calculated and obtained as $MV_{t(f,3-2)}$. As a result, a desired motion vector $MV_{T(f,3-2)}$ is calculated and represented as:

$$MV_{T(f,3-2)} = -\left(MV_{t(b,2-4)} - \sum_{n=1}^{4}\left(MV_{(3-4)_n^1}\times R_{(2-3)_n^1}\right)\right). \quad (9)$$

Conversely, if $R_{(2-4)}\times R_{(2-3-4)}<R_{(3-1)}\times R_{(3-2-1)}$, the macroblock MB(1',1')$_1$ is determined as a dominant macroblock using the BDVS method. Thus, the motion vector of the macroblock MB(0,0)$_3$ is re-calculated and a desired motion vector $MV_{T(f,3-2)}$ is calculated and represented as:

$$MV_{T(f,3-2)} = MV_{t(f,3-1)} - \sum_{n=1}^{4}\left(MV_{(2-1)_n^1}\times R_{(3-2)_n^1}\right). \quad (10)$$

Figure 4A:
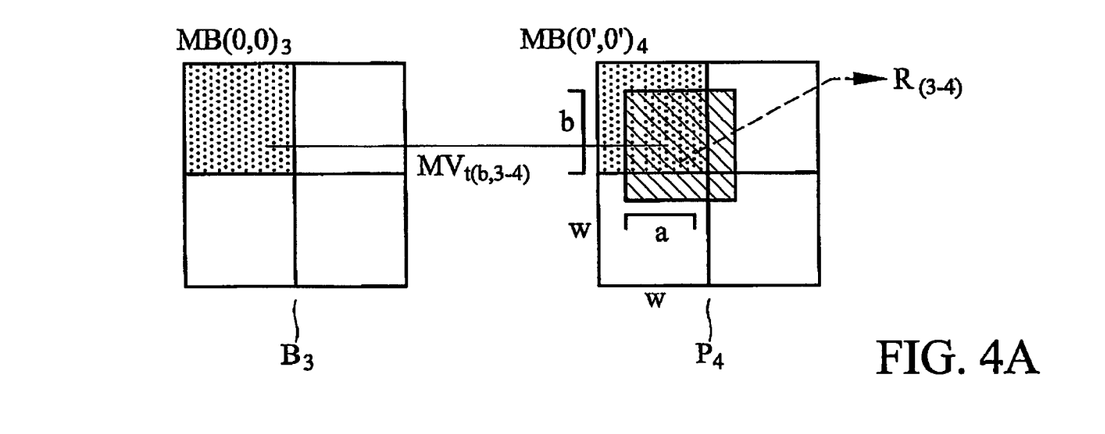
FIGS. 4A and 4B are schematic views of an embodiment of video frame conversion from a P-frame to a P-frame, in which the P-frame is placed after a B-frame.
Figure 4B:
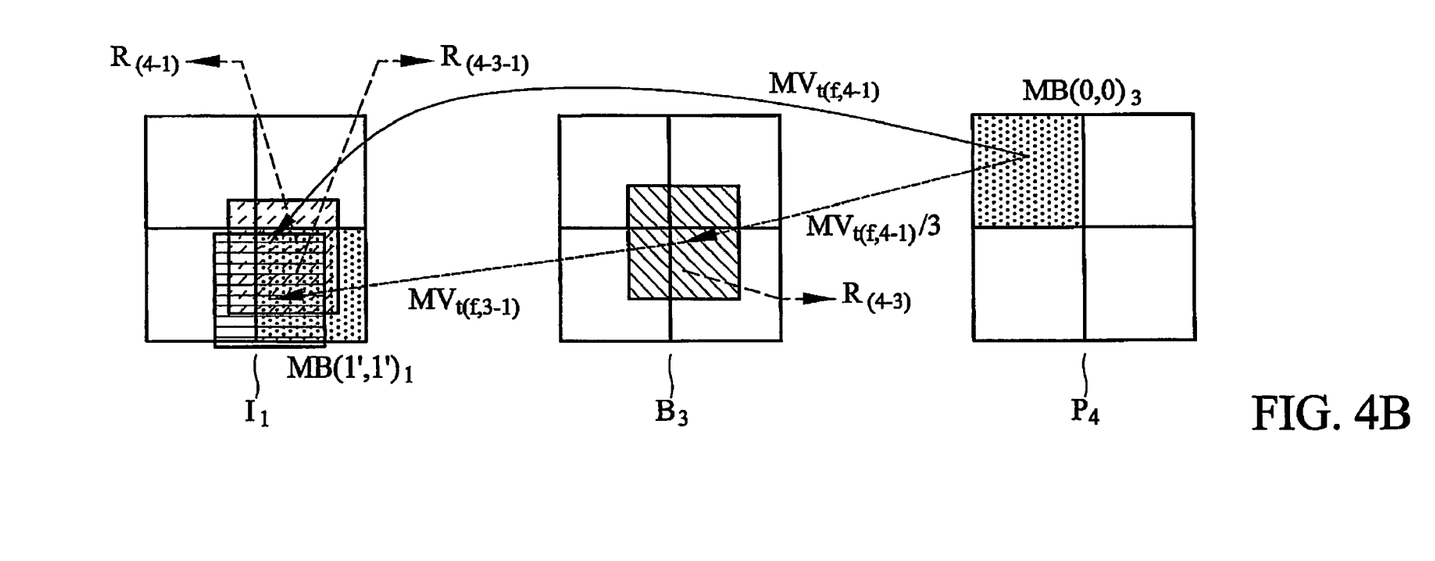

Referring to FIGS. 4A and 4B, considering the type 3, $P_4$ frame comprises only one motion vector from $P_4$ frame to $I_1$ frame. A macroblock MB(0,0)$_3$ of $P_4$ frame comprises two different motion vectors. Similarly, as shown in FIGS. 2A and 2B, a desired motion vector from the converted $P_4$ frame (i.e. $P_4$ frame) is determined by a motion vector from $B_3$ frame to $P_4$ frame or a trisected motion vector from $P_4$ frame to $I_1$ frame using the equation (1), thereby calculating MORs $R_{(3-4)}$, $R_{(4-1)}$, and $R_{(4-3-1)}$ respectively for comparison. Next, MOR $R_{(3-4)}$ and MOR $R_{(4-1)}$ relative to MOR $R_{(4-3-1)}$ of dominant macroblocks are compared using the following equation, represented as:

$$\max(R_{(3-4)}, R_{(4-1)}\times R_{(4-3-1)}) \quad (11)$$

MOR $R_{(4-3-1)}$ is calculated according to a virtual macroblock overlapping $B_3$ frame with the directed motion vector $MV_{t(f,4-1)}/3$. Thus, a motion vector of a macroblock overlapping $I_1$ frame based on the macroblock overlapping $B_3$ frame is calculated using the following equation, represented as:

$$\sum_{n=1}^{4}\left(MV_{(3-1)_n^1}\times R_{(4-3)_n^1}\right). \quad (12)$$

If $R_{(3-4)}>R_{(4-1)}\times R_{(4-3-1)}$, the macroblock MB (0',0') determined as a dominant macroblock using the BDVS method. Thus, the motion vector of the macroblock MB (0,0)$_3$ is re-calculated and obtained as $MV_{t(f,4-3)}$. As a result, a desired motion vector $MV_{T(f,4-3)}$ is calculated and represented as:

$$MV_{t(f,4-3)}=-MV_{t(b,3-4)} \quad (13).$$

If $R_{(3-4)}<R_{(4-1)}\times R_{(4-3-1)}$, the macroblock MB(1',1')$_1$ is determined as a dominant macroblock using the BDVS method. Thus, the motion vector of the macroblock MB(0', 0')$_4$ is re-calculated and obtained as $MV_{t(f,4-3)}$. As a result, a desired motion vector $MV_{T(f,4-3)}$ is calculated and represented as:

$$MV_{T(f,4-3)} = MV_{t(f,4-1)} - \sum_{n=1}^{4}\left(MV_{(3-1)_n^1}\times R_{(4-3)_n^1}\right). \quad (14)$$

Figure 5:
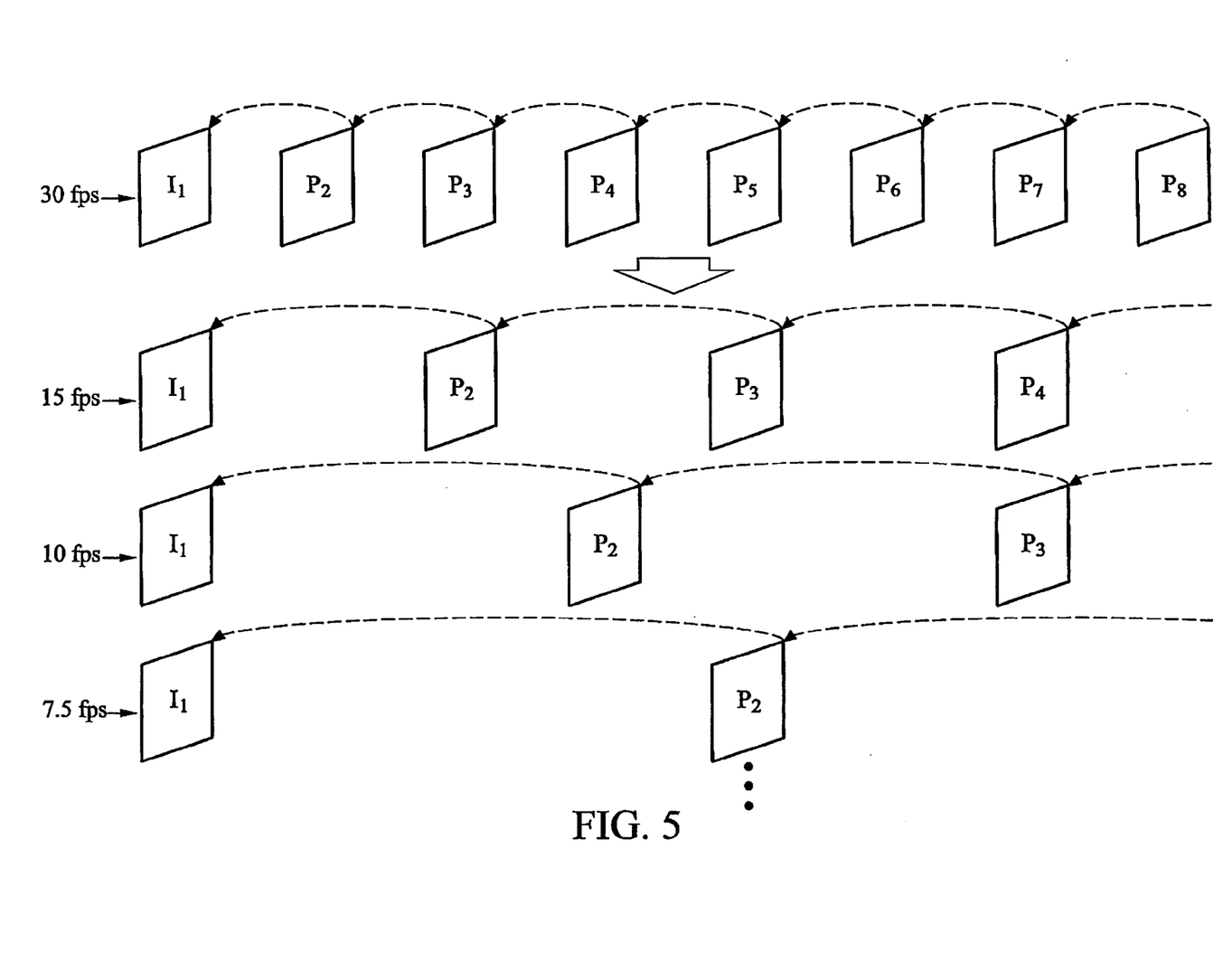
FIG. 5 is a schematic view of an embodiment of converted frames.

As described motion vectors of each frame using the equations, all input frames of video data are completely converted, thereby remaining only I- and P-frames are encoded relative to the past reference frame, as shown in FIG. 5. Thus, frame rate reduction can be implemented and image quality can be enhanced using, but not limited to, a Forward Dominant Vector Selection (FDVS) method disclosed in "Motion Vector Refinement for High-Performance Transcoding", IEEE Trans. on Multimedia, Vol. 1, pp. 30-40, March 1999 based on the converted frames.

Figure 6:
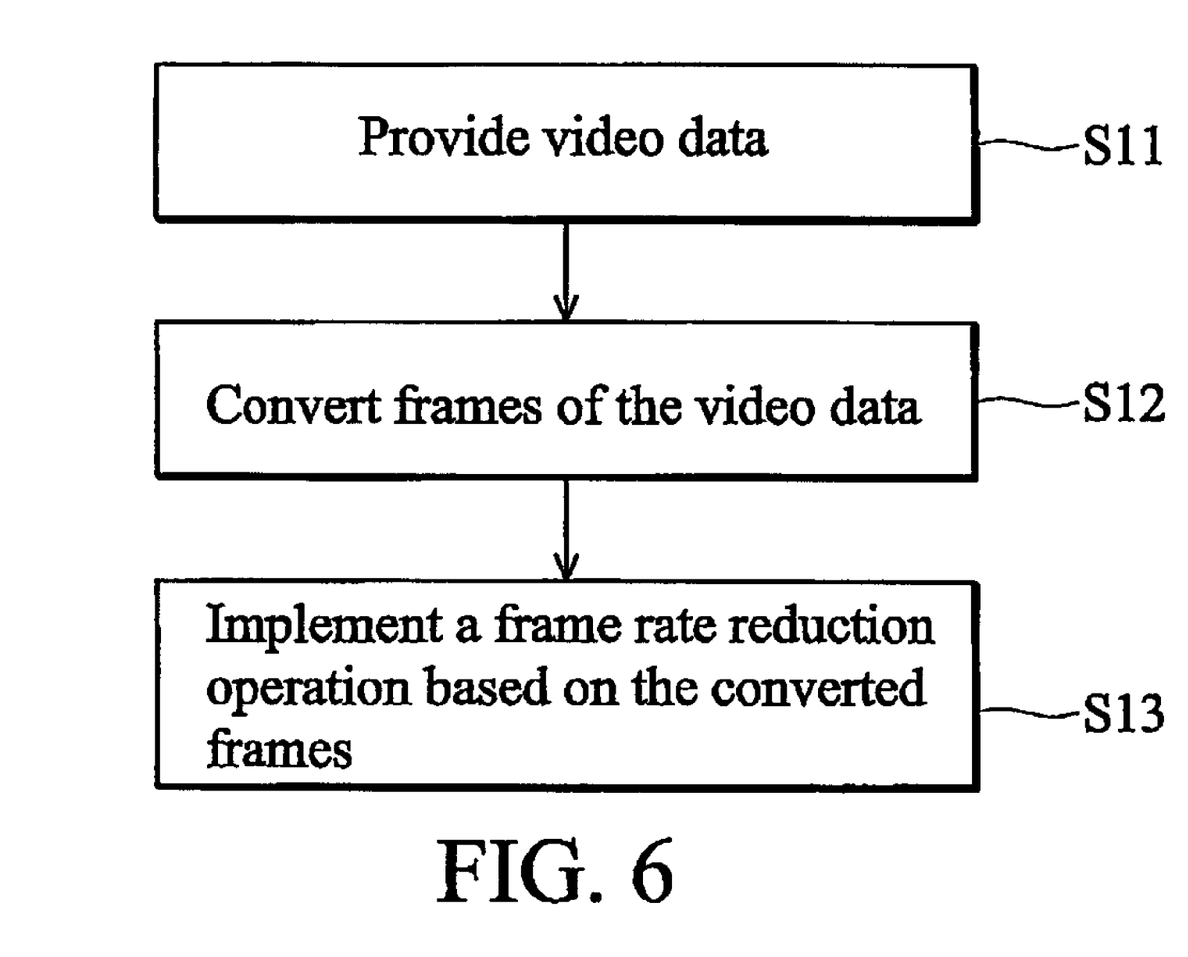
FIG. 6 is a flowchart of an embodiment of a video conversion method for frame rate reduction.

FIG. 6 is a flowchart of an embodiment of a video conversion method for frame rate reduction.

Video data comprising at least one I-frame and a plurality of B- and P-frames is provided (step S11). The B- and P-frames are converted to P-frames using a Bi-direction Dominant Vector Selection (BDVS) method (step S12), thereby the I-frame and a plurality of P-frames remain. A frame rate reduction operation is implemented based on the converted frames using a Forward Dominant Vector Selection (FDVS) method (step S13).

Figure 7:
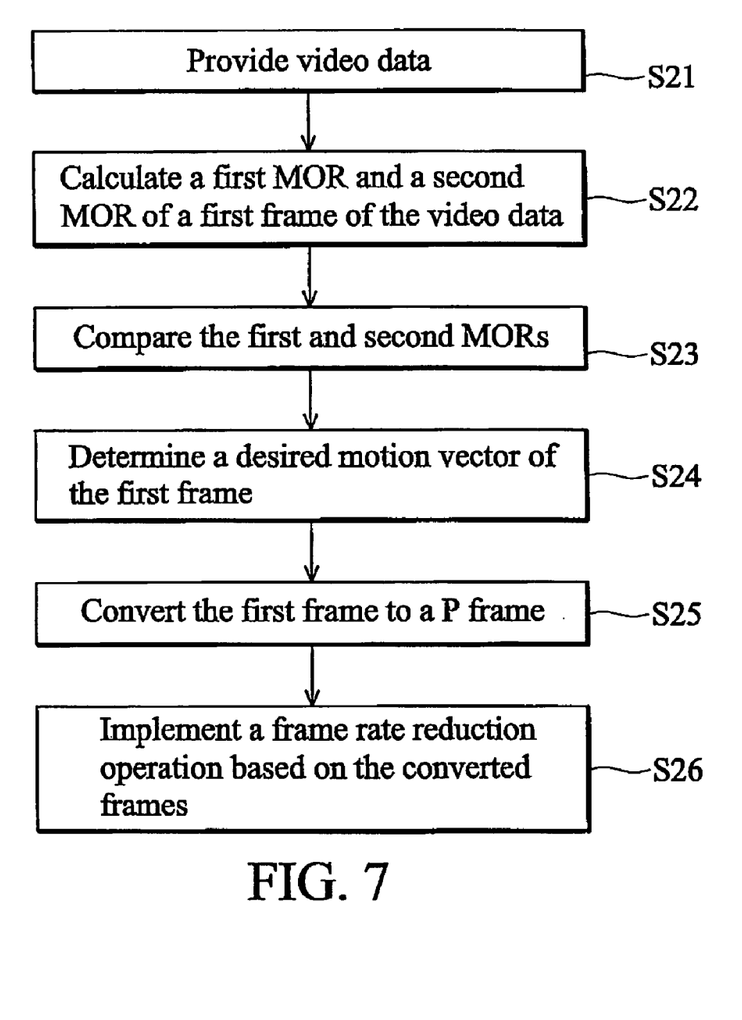
FIG. 7 is a flowchart of another embodiment of the video conversion method for frame rate reduction.

FIG. 7 is a flowchart of another embodiment of the video conversion method for frame rate reduction.

Video data comprising at least one I-frame, a first frame, and a second frame are provided (step S21). The I-frame is the first placed frame and the first frame is between the I-frame and second frame. A first MOR and a second MOR of the first frame are calculated (step S22). The first MOR relates to a first motion vector directed to the I-frame and the second MOR relating to a second motion vector directed to the second frame. The first and second MORs are compared (step S23) and a desired motion vector of the first frame is determined accordingly (step S24). The first frame is converted to a P-frame using a Bi-direction Dominant Vector Selection (BDVS) method according to the desired motion vector (step S25). A frame rate reduction operation is implemented based on the converted frames using a Forward Dominant Vector Selection (FDVS) method (step S26).

The video conversion method of the invention enable an arbitrary frame rate to satisfy the lack of sufficient bandwidth available for video transmission, low player efficiency, and rapid browsing.

Although the invention has been described in terms of preferred embodiment, it is not intended to limit the invention thereto. Those skilled in the technology can still make various alterations and modifications without departing from the scope and spirit of this invention. Therefore, the scope of the present invention shall be defined and protected by the following claims and their equivalents.

What is claimed is:

1. A video conversion method for frame rate reduction, comprising:
   providing video data comprising at least one I-frame and a plurality of first and second frames;
   converting, using a processor, the first and second frames to P-frames using a first image processing method, thereby leaving the I-frame and a plurality of P-frames; and implementing, using the processor, a frame rate reduction operation based on the converted frames using a second image processing method, wherein frame conversion further comprises:

defining a macroblock for conversion a converted frame;

defining a at least one virtual macroblock overlapping the macroblock;

respectively calculating a an overlapping ratio of an overlapped square area of the at least one virtual macroblock to a square area of the macroblock; and determining a desired motion vector of the converted frame using with a maximum overlapping ratio (MOR).

2. The method as claimed in claim 1, wherein the first image processing method is a Bi-direction Dominant Vector Selection (BDVS) method.

3. The method as claimed in claim 2, wherein the second image processing method is a Forward Dominant Vector Selection (FDVS) method.

4. A video conversion method for frame rate reduction, comprising:

providing video data comprising at least one I-frame, a first frame, and a second frame, wherein the I-frame is the first placed frame and the first frame is between the I-frame and second frame;

calculating, using a processor, a first MOR and a second MOR of the first frame, wherein the first MOR relates to a first motion vector directed to the I-frame and the second MOR relating to a second motion vector directed to the second frame;

comparing the first and second MORs;

determining a desired motion vector of the first frame according to the comparison result;

converting the first frame to a P-frame using a first image processing method according to the desired motion vector; and implementing a frame rate reduction operation based on the converted frames using a second image processing method.

5. The method as claimed in claim 4, wherein MOR calculation further comprises:

defining a first macroblock of the I-frame;

defining a first virtual macroblock of the first frame, overlapping the first macroblock; and calculating a first ratio of an overlapped square area of the first virtual macroblock to a square area of the first macroblock, thereby obtaining the first MOR.

6. The method as claimed in claim 5, wherein MOR calculation further comprises:

defining a second macroblock of the I-frame;

defining a second virtual macroblock of the first frame, overlapping the second frame;

defining a third virtual macroblock of the first frame, mapping the second virtual macroblock and overlapping the second macroblock of the I-frame;

calculating a second ratio of an overlapped square area of the third virtual macroblock to a square area of the second macroblock, thereby obtaining the second MOR.

7. The method as claimed in claim 6, wherein MOR calculation further comprises:

comparing the first and second ratios; and converting the first frame to the P-frame according to the comparison results.

8. The method as claimed in claim 7, wherein the first image processing method is a Bi-direction Dominant Vector Selection (BDVS) method.

9. The method as claimed in claim 8, wherein the second image processing method is a Forward Dominant Vector Selection (FDVS) method.

* * * * *